US009649790B2

(12) United States Patent
Shinozaki

(10) Patent No.: US 9,649,790 B2
(45) Date of Patent: May 16, 2017

(54) MANUFACTURING METHOD FOR DOUBLE-SIDED ADHESIVE MATERIAL, AND ARTICLE PROVIDED WITH DOUBLE-SIDED ADHESIVE MATERIAL

(71) Applicant: 3M INNOVATIVE PROPERTIES COMPANY, St. Paul, MN (US)

(72) Inventor: Kotaro Shinozaki, Kanagawa-pref. (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/361,886

(22) PCT Filed: Nov. 30, 2012

(86) PCT No.: PCT/US2012/067275
§ 371 (c)(1),
(2) Date: May 30, 2014

(87) PCT Pub. No.: WO2013/082416
PCT Pub. Date: Jun. 6, 2013

(65) Prior Publication Data
US 2014/0356619 A1    Dec. 4, 2014

(30) Foreign Application Priority Data

Dec. 2, 2011    (JP) ................................. 2011-264570

(51) Int. Cl.
*B29C 41/02*    (2006.01)
*C09J 7/02*    (2006.01)
(Continued)

(52) U.S. Cl.
CPC ................ *B29C 41/02* (2013.01); *B31D 1/02* (2013.01); *C09J 7/02* (2013.01); *B29C 31/044* (2013.01);
(Continued)

(58) Field of Classification Search
CPC .................. B29C 31/044; B29C 35/08; B29C 2035/0822; B29C 2035/0827;
(Continued)

(56) References Cited

U.S. PATENT DOCUMENTS 5,446,080 A    8/1995   Shima et al.
6,060,408 A *  5/2000   Monica .................. A63B 71/08
                                              2/455

(Continued)

FOREIGN PATENT DOCUMENTS

JP    H01-297416    11/1989
JP    H04-335073    11/1992
(Continued)

OTHER PUBLICATIONS

PCT International Search Report from PCT/US2012/067275 mailed on Jun. 19, 2013, 3 pages.

*Primary Examiner* — Jeffrey Wollschlager
(74) *Attorney, Agent, or Firm* — Philip Y. Dahl; Dena M. Ehrich

(57) ABSTRACT

To provide a method for manufacturing a double-sided adhesive material suitable for the size and shape of various articles using a simple process without reducing the yield of the adhesive material that is used, and to provide an article with a double-sided adhesive material that uses the double-sided adhesive material obtained by this manufacturing method. [Resolution means] Liquid photo curing adhesive 12 is applied by direct drawing onto a specific region corresponding to the size and shape of an article to be used, on the surface of a first plate 10, using a robot. A sheet shaped second plate 20 is placed on the first plate 10 where the adhesive 12 was applied, such that the adhesive 12 is interposed between both plates. Light for curing the adhesive is then irradiated from both sides of the adhesive 12 so (Continued)

that the light will pass through both the first plate 10 and the second plate 20 and reach the adhesive 12.

2 Claims, 2 Drawing Sheets

(51) Int. Cl.
*B31D 1/02* (2006.01)
*B29C 35/08* (2006.01)
*B29C 31/04* (2006.01)
*B29C 41/08* (2006.01)
*B29C 41/36* (2006.01)
*B29C 37/00* (2006.01)
*B29L 7/00* (2006.01)

(52) U.S. Cl.
CPC .......... *B29C 35/08* (2013.01); *B29C 35/0888* (2013.01); *B29C 35/0894* (2013.01); *B29C 37/0075* (2013.01); *B29C 41/08* (2013.01); *B29C 41/365* (2013.01); *B29C 2035/0822* (2013.01); *B29C 2035/0827* (2013.01); *B29L 2007/001* (2013.01); *C09J 2201/128* (2013.01); *C09J 2433/00* (2013.01); *Y10T 428/2809* (2015.01)

(58) Field of Classification Search
CPC ............ B29C 35/0888; B29C 35/0894; B29C 37/0075; B29C 41/08; B29C 41/365; B29C 41/02; C09J 7/02; C09J 2433/00; C09J 2201/128; B29L 2007/001; B31D 1/02; Y10T 428/2809
See application file for complete search history.

(56) References Cited

U.S. PATENT DOCUMENTS

| | | | |
|---|---|---|---|
| 6,565,697 B1 | 5/2003 | Maercklein | |
| 7,132,159 B1* | 11/2006 | Akhave | B05D 1/00 156/310 |
| 2002/0146864 A1* | 10/2002 | Miyaki | H01L 23/49503 438/123 |
| 2002/0170213 A1* | 11/2002 | Latschbacher | A01G 23/099 40/299.01 |
| 2006/0093775 A1* | 5/2006 | Konig | B65H 19/102 428/40.1 |
| 2006/0113714 A1* | 6/2006 | Giloh | B29C 33/46 264/517 |
| 2008/0299346 A1* | 12/2008 | Onderisin | B31D 1/027 428/41.8 |
| 2009/0258176 A1* | 10/2009 | Muta | B32B 27/08 428/41.5 |
| 2009/0292095 A1* | 11/2009 | Niwa | C09J 7/0217 526/307.6 |
| 2009/0297724 A1* | 12/2009 | Weber | C09D 133/14 427/520 |
| 2010/0021730 A1 | 1/2010 | Kondou et al. | |
| 2010/0085410 A1* | 4/2010 | Dashiell | B41J 2/32 347/197 |
| 2010/0209703 A1 | 8/2010 | Takarada et al. | |
| 2010/0233467 A1* | 9/2010 | Niwa | C09J 4/00 428/323 |
| 2011/0076493 A1* | 3/2011 | Kavanagh | C08F 8/32 428/355 N |
| 2011/0223394 A1* | 9/2011 | Daigaku | C09J 7/0217 428/195.1 |
| 2011/0244230 A1 | 10/2011 | Tsubaki et al. | |
| 2012/0058289 A1* | 3/2012 | Coates | B32B 5/26 428/41.8 |
| 2012/0116424 A1* | 5/2012 | Lee | A61L 24/046 606/151 |
| 2013/0037204 A1 | 2/2013 | Kurimura et al. | |

FOREIGN PATENT DOCUMENTS

| | | |
|---|---|---|
| JP | 2005-055641 | 3/2005 |
| JP | 2007-314779 | 12/2007 |
| JP | 2011-148856 | 8/2011 |
| JP | 2012-152677 | 8/2012 |
| WO | WO 02/18511 | 3/2002 |
| WO | WO2010042995 * | 4/2010 |

* cited by examiner

MANUFACTURING METHOD FOR DOUBLE-SIDED ADHESIVE MATERIAL, AND ARTICLE PROVIDED WITH DOUBLE-SIDED ADHESIVE MATERIAL

BACKGROUND

Technical Field

The present invention relates to a manufacturing method for a double-sided adhesive material and to an article provided with this double-sided adhesive material. In particular, the present invention relates to a manufacturing method for a double-sided adhesive material that can be used for attaching articles such as emblems, nameplates, and the like to a subject such as an automobile or the like, and also relates to an article provided with this double-sided adhesive material.

Related Art

Conventionally, when attaching an article such as an emblem, a nameplate, or the like to the chassis of an automobile, a method is used where one surface of double-sided adhesive tape is adhered to the article, the double-sided adhesive tape is cut to match the contour shape of the article, and then the other surface of the double-sided adhesive tape is adhered to the chassis. Alternatively, the double-sided adhesive tape may be punched out or cut to match the contour shape of the article, after which one surface of the double-sided adhesive tape is adhered to the article. For example, Japanese Unexamined Patent Application Publication No. 2002-80802 describes that "the acrylic foam adhesive that was obtained can be used as an industrial sealing agent, an adhesive, or the like in a roll shape, sheet shape, a punched out processed part, or a strap shape."

Another method is to apply adhesive to the article using screen printing. Japanese Unexamined Patent Application Publication No. H1-297416 describes "screen printing is frequently used when a pressure sensitive adhesive layer is formed on a text, design, or other printing layer on a thin transfer printing sheet or the like, or when a pressure sensitive adhesive layer is provided for securing various types of operating panels of various instrument panels and electronic devices of an automobile or the like".

RELATED ART DOCUMENTS

Patent Literature

Patent Document 1: Japanese Unexamined Patent Application Publication No. 2002-80802
Patent Document 2: Japanese Unexamined Patent Application Publication No. H1-297416

OUTLINE OF THE INVENTION

Problems to be Solved by the Invention

With the method where the double-sided adhesive tape is cut to match the contour shape of the article, if the contour shape of the article is complex rather than a simple rectangle or the like, or if the size of the article is large and the double-sided adhesive tape is to be applied to only a portion of the back surface thereof, a relatively large amount of double-sided adhesive tape must be discarded, and depending on the shape of the article, much of the double-sided adhesive tape that is used will be wasted, and the yield may be extremely inferior.

Furthermore, when adhesive is formed on the article by screen printing, a pattern for screen printing must be used, and a pattern that matches the shape of each article must be prepared beforehand, which is disadvantageous from a manufacturing cost perspective.

Therefore, an object of the present invention is to provide a method for manufacturing a double-sided adhesive material suitable for the size and shape of various articles using a simple process without reducing the yield of the adhesive material that is used, and to provide an article with a double-sided adhesive material that uses the double-sided adhesive material obtained by this manufacturing method.

SUMMARY

In order to achieve the aforementioned object, one aspect of the present invention is a method for manufacturing a double-sided adhesive material for attaching an article to a subject, including a step of applying a photo curing adhesive by direct drawing onto a specific region that corresponds to a shape of the article on one surface of a sheet shaped first transparent member using a robot equipped with a nozzle for spraying an adhesive solution, wherein the robot is movable in a minimum of two dimensions, a step of irradiating light onto and curing the adhesive that was applied to the surface of the first transparent member, and a step of removing the cured adhesive from the surface of the first transparent member to obtain a double-sided adhesive material.

Another aspect of the present invention provides an article with a double-sided adhesive material, wherein the double-sided adhesive material manufactured by the above manufacturing method is applied to a back surface.

Effect of the Invention

With the manufacturing method for the double-sided adhesive material according to the present invention, adhesive is applied only to a specific region corresponding to the shape of the article on a sheet shaped first transparent member by direct drawing using a robot, and therefore double-sided adhesive material can be formed by a simple process to a suitable shape and size that matches the various articles to be used, without using a specific pattern or the like. Therefore, the present invention can provide a manufacturing method for a double-sided adhesive material suitable for an article of any size and shape, without reducing the yield of the adhesive material that is used, as well as an article with an adhesive material that uses the double-sided adhesive material obtained by the aforementioned manufacturing method.

BRIEF DESCRIPTION OF THE DRAWING(S)

DETAILED DESCRIPTION

Figure 1:
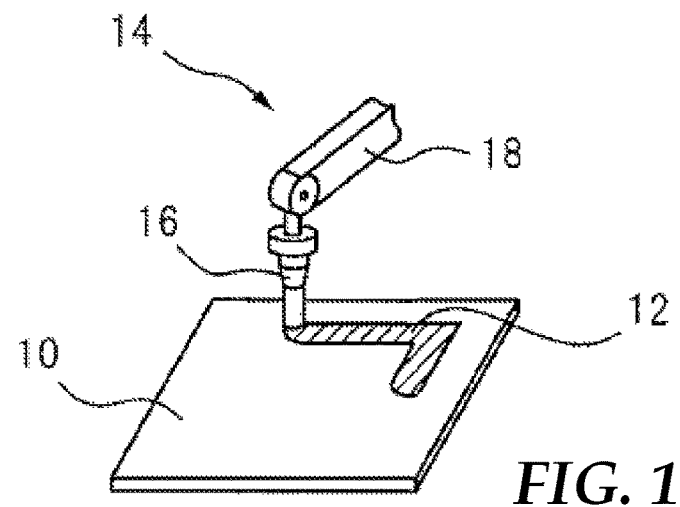
FIG. 1 is a diagram illustrating the step of applying the adhesive onto the first transparent plate in the manufacturing method according to an embodiment of the present invention.

A manufacturing method for a double-sided adhesive material that is used for attaching an article to a subject is described as a nonlimiting embodiment of the present invention while referring to the drawings. First, a sheet shaped first transparent member 10 is prepared and positioned essentially horizontally, as shown in FIG. 1. Herein, the term "sheet shape" includes film shapes and plate shapes. Moreover, the first transparent member can be a plastic film, glass substrate, or the like that can transmit ultraviolet light, either alone or as a laminated material. Furthermore, the term "transparent" means that light irradiated on the adhesive can pass through when curing the photo curing adhesive described below, and for example, indicates that approximately 30% or more, preferably 50% or more, of ultraviolet light (200 nm to 380 nm) can pass through when an ultraviolet light curable adhesive is used. Hereinafter, the first transparent member is referred to as the first plate.

Next, liquid photo curing adhesive (hereinafter simply referred to as adhesive) 12 is applied by direct drawing onto a specific region corresponding to a size and shape of the article to be used, on the surface of the first plate 10, using a robot. Herein, the term "robot" refers to a device that can automatically control movement such as two-dimensional or three-dimensional position, travel speed, travel direction, and the like. The robot used herein has a nozzle for spraying the adhesive solution, and can automatically control the position of the nozzle relative to the first plate in at least two dimensions. This robot can be a device with a fixed position nozzle for spraying solution and a carriage that can move in the XY direction, a nozzle for spraying solution that can move in the X direction and a carriage that can move in the Y direction, or a nozzle for spraying that can move in the XY direction and a carriage with a fixed position, and that can control the amount of travel, travel speed, and amount of solution sprayed using a program.

For example, a robot 14 with a robot arm 18 mounted with a nozzle 16 for spraying adhesive attached on the tip end is provided, and the robot 14 is controlled such that the spray port of the nozzle moves along a travel path corresponding to the contour shape of the article, and adhesive is applied onto the surface of the first plate 10 through direct drawing by spraying adhesive at a predetermined flow rate from the spray port of the nozzle 16.

An example of a photo curing adhesive 12 is an acrylic adhesive that is cured by ultraviolet light. Specifically, acrylic adhesives can be used that include additives such as fillers, colorants, antioxidants, and the like in a copolymer obtained by photo polymerizing a blended solution containing one or more type of component selected from butyl acrylate, hexyl acrylate, 2-ethyl hexyl acrylate, octyl acrylate, iso-octyl acrylate, nonyl acrylate, isononyl acrylate, stearyl acrylate, isostearyl acrylate, decyl acrylate, dodecyl acrylate, isobornyl acrylate, benzyl acrylate, phenoxy ethyl acrylate, and other alkyl (meth)acrylate monomers, acrylic acid, N-dimethyl acrylamide, N-vinyl caprolactam, N-vinyl pyrrolidone, N-vinyl piperidine, acryloyol morpholin, and other co-polymeric vinyl monomers.

Figure 2:
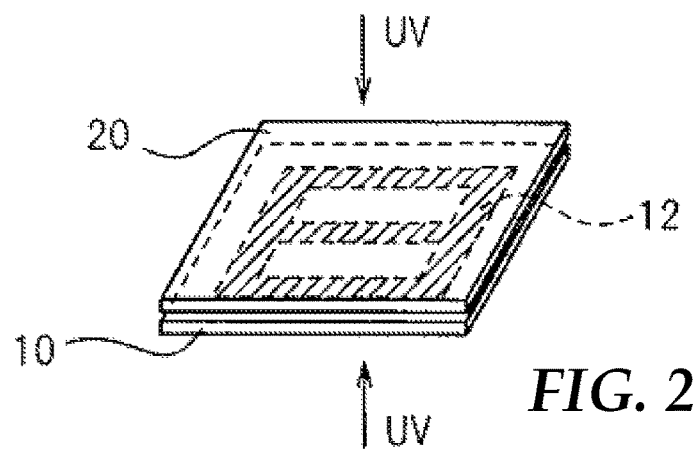
FIG. 2 is a diagram for illustrating the step of positioning a second transparent plate after the adhesive has been applied, and performing ultraviolet light irradiation.
Figure 3:
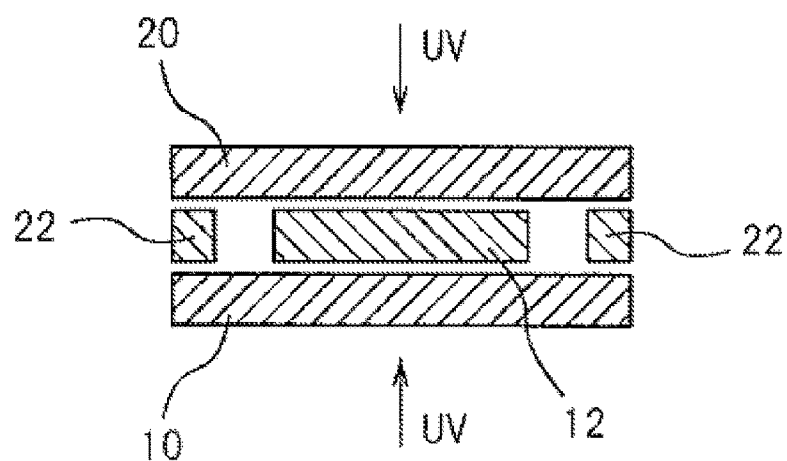
FIG. 3 is a side cross-section view from the lateral direction of the first and second transparent plates in the second step.

Next, as illustrated in FIG. 2, a sheet shaped second transparent (for example ultraviolet light transmissive) member 20 (hereinafter referred to as second plate) is placed on the first plate 10 where the adhesive 12 has been applied.

In this manner, the adhesive 12 is interposed between both plates. Similar to the first plate, the second plate can be a plastic film or glass substrate that can transmit ultraviolet light, either alone or as a laminated material. Light (for example ultraviolet light) for curing the adhesive is then irradiated from both sides of the adhesive 12 so that the light will pass through both the first plate 10 and the second plate 20 and reach the adhesive 12. In the example illustrated in the figures, ultraviolet light is irradiated from both the bottom surface side of the first plate 10 and the top surface side of the second plate 20 to cure the adhesive 12.

Herein, as illustrated in side cross-section view 3, a spacer 22 can be provided in advance in order to create an interval of a predetermined distance between both plates prior to overlaying the second plate 20 on the first plate 10. The thickness of the adhesive during application can be adjusted by adjusting the viscosity of the adhesive that is used, but the thickness of the gap between the first plate 10 and the second plate 20 can be made uniform across the entire surface of the plate when performing the photo curing described below by using a spacer 22, and thus the thickness of the adhesive material after photo curing can be made uniform. Moreover, the thickness of the spacer 22 can be arbitrarily set depending on the predetermined thickness of the adhesive material, and for example can be 0.2 mm or more, 0.4 mm or more, or 0.6 mm or more, and 1.0 mm or less, 1.5 mm or less, or 2.0 mm or less.

The adhesive 12 preferably has a certain level of viscosity that allows a predetermined shape to be generally maintained without flowing until the ultraviolet light curing described below is performed. Specifically, the viscosity is 2 Pa-s or higher for example. Moreover, the viscosity is more preferably 6 Pa-s or higher, and particularly preferably 8 Pa-s or higher. The viscosity of the adhesive can be controlled by adding a thixotropy contributing material or by increasing the amount of polymer content in the adhesive. Furthermore, a hollow glass filler or silica filler may be added to the adhesive 12 in order to provide the desired cushioning to the double-sided adhesive material that is eventually obtained. Furthermore, the viscosity of the adhesive can also be increased by adding these fillers.

Figure 4:
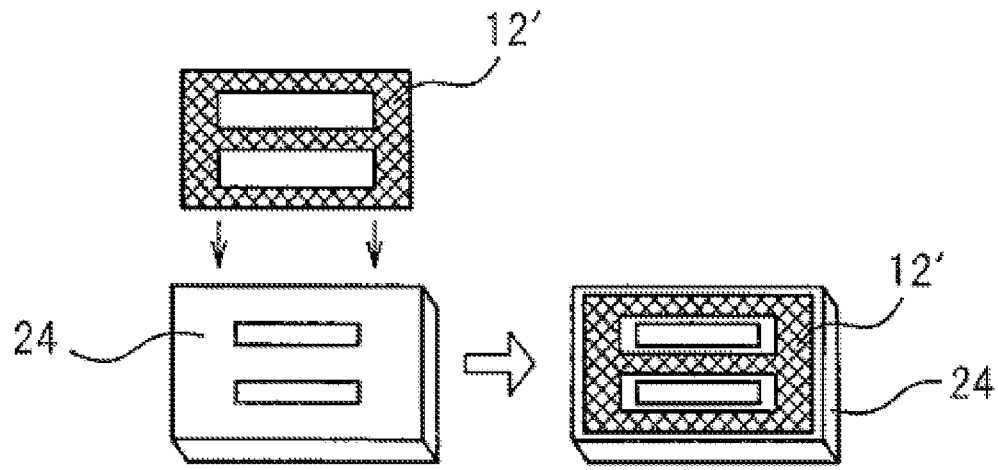
FIG. 4 is a diagram that illustrating the step of attaching the cured adhesive to the article.

As illustrated in FIG. 4, the double-sided adhesive material 12' obtained by photo curing the adhesive 12 is removed from the first plate 10 and the second plate 20. One surface of the double-sided adhesive material 12' is then attached to the article 24, and a release sheet (not shown in the drawings) or the like is attached to the other surface to obtain an article 24 with adhesive material attached. Alternatively, at first, only one of the first plate 10 or second plate 20 is removed from the photo cured adhesive material, and the other plate can be removed after applying the adhesive surface of the adhesive material to the article 24. In the example shown in the figures, the article 24 has a mounting surface with dimensions that are generally the same or slightly larger than the adhesive material 12', and thereby essentially the entire surface of the article 24 can be favorably attached to the subject such as the chassis of an automobile or the like. Moreover, in order to ease peeling of the adhesive material 12' from either the first plate 10 or the second plate 20, both of the plate surfaces may be directly treated with silicone, or a resin film treated with silicone may be applied to the surface.

Figure 5:
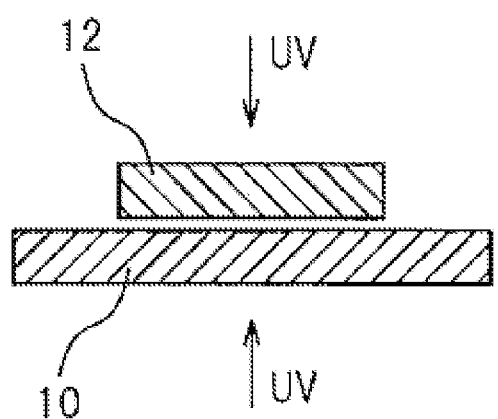
FIG. 5 is a diagram similar to FIG. 3 and describes the step of performing ultraviolet light irradiation without using the second transparent plate.

Moreover, as illustrated in FIG. 5, the step of positioning the second plate 20 described in FIG. 2 prior to irradiating the ultraviolet light from the top and bottom directions may be eliminated. In other words, the ultraviolet light can be directly irradiated onto the upper surface of the adhesive 12 without passing through an optically transparent plate. If the adhesive 12 is an acrylic adhesive, the chemical reaction will be affected by oxygen in the environment, such that the curing reaction is hindered and the desired adhesive force may not be achievable. Therefore, the step of irradiating the ultraviolet light is preferably performed in an environment that does not contain oxygen, such as nitrogen gas or the like. However, if a plate is positioned on both sides of the adhesive 12 as illustrated in FIG. 2, both surfaces of the adhesive will essentially be in a sealed condition because of the plates. Therefore, problems will not occur even if the ultraviolet light irradiation is performed in normal air.

With the embodiment of the present invention, the adhesive can be applied by directly drawing in a specified region that corresponds to the shape of each article using a robot. Therefore, the size and shape of the adhesive can be arbitrarily set without using a pattern such as with screen printing. Therefore, even if the article has a specific shape, double-sided adhesive material that corresponds to the optimum shape for attaching the article to the subject can be achieved. Furthermore, the photo curing adhesive is positioned on a transparent plate without directly applying to the article, and therefore the subsequent photo curing step can be easily and properly performed. Furthermore, unlike the case of using double-sided adhesive tape that causes considerable waste, the adhesive that is applied is theoretically used entirely as an adhesive material. Therefore, almost no waste is generated, which is extremely advantageous both from a cost perspective and an environmental perspective.

The double-sided adhesive material obtained in this manner is attached to the back surface of the article, and can be used for attaching the article to the subject. Examples of this type of article can include but are not limited to emblems, nameplates, side-quarter glass, slide rails, bumper molds, door hole seals, portions of mirrors such as side mirrors, and the like that are attached to the chassis of an automobile. Furthermore, the subject is not restricted to automobiles, and various types of electrical products, furniture, and other subjects can also be included as examples. The double-sided adhesive material of the present embodiment can be used for attaching various diverse types of articles to various types of subjects.

Working Example

Hereinafter, the manufacturing method for a double-sided adhesive material that is used for attaching an article of the present invention to a subject is described as a nonlimiting working example. First, 90 parts by weight of 2-ethyl hexyl acrylate (2-EHA) produced by Nippon Catalyst, 10 parts by weight of acrylic acid produced by Mitsubishi Chemical, and 0.05 parts by weight of a photoinitiator (Irgacure 651) produced by CIBA Specialty Chemicals were blended together and the mixture was irradiated with ultraviolet light until the viscosity of the mixture obtained was 2 Pa-s. Next, 100 parts by weight of this mixture, 0.1 parts by weight of the photoinitiator (Irgacure 651) produced by CIBA Specialty Chemicals, 1.5 parts by weight of silica filler (A200) produced by Nippon Aerosyl, 5.0 parts by weight of hollow glass filler (glass bubbles) produced by 3M, and 0.1 parts by weight of an acrylic cross-linking agent (HDDA) produced by Shin-Nakamura Chemical Co., Ltd. were blended together to obtain an acrylic ultraviolet light curing adhesive in solution form. Moreover, the viscosity of this adhesive was 8 Pa-s (8000 cps).

Next, the first plate was prepared by applying 50 μm thick polyethylene terephthalate (PET) that was silicone treated on the surface onto a 5 mm thick glass substrate, and then placed on a horizontal surface. The adhesive was applied by direct drawing onto a specific region corresponding to the shape of the article on the PET surface of the first plate using a robot. The robot was a coating shape controlling robot (2200 Nmini) manufactured by San-ei Tech Ltd., equipped with a dispense controller (Performus V) manufactured by Nordson EFD and a dispense valve which is a nozzle for spraying adhesive (725 DA-SS Fluid Chamber). The adhesive was applied by direct drawing onto a specific region of the first plate at a rate of 50 mm/second corresponding to the contour of the article with a line thickness of approximately 3 mm. Moreover, the thickness of the adhesive was adjusted to approximately 0.8 mm.

Spacers formed from a 0.8 mm thick stainless steel sheet were then placed around the outside of the application area on the PET surface of the first plate. The second plate made by applying a silicon peel treated PET film on a glass substrate similar to the first plate was placed on the first plate such that the PET surfaces were facing each other with the spacers and adhesive interposed therebetween, and thus the adhesive was sandwiched between the first plate and the second plate.

Ultraviolet light was then irradiated onto the adhesive from both sides through the first and second plates in order to cure the adhesive. Moreover, the ultraviolet light irradiating device was a UV lamp (VC 7692T12) produced by Sylvania. The amount of irradiated ultraviolet light was 1 J. Finally, the glass substrates of the first and second glass plates were removed to obtain a double-sided adhesive material sandwiched between PET films.

The PET film was then peeled from one side of the double-sided adhesive material, and the exposed adhesive surface was applied to the back surface of the article to obtain an article with adhesive material attached.

DESCRIPTION OF REFERENCE SYMBOLS 10 and 20: Transparent plate
12: Adhesive
14: Robot
22: Spacer
24: Article.

What is claimed is:
1. A method for manufacturing a double-sided adhesive material for attaching an article to a subject, comprising:
  a step of applying a photo curing adhesive by direct drawing onto a specific region that corresponds to a shape of the article on one surface of a sheet shaped first transparent member using a robot equipped with a nozzle for spraying an adhesive solution, the robot being able to move in at least two dimensions;
  a step of placing a sheet shaped second transparent member onto the first transparent member with the adhesive that had been applied onto the surface of the first transparent member interposed therebetween so as to sandwich the adhesive between the first transparent member and the second transparent member, after the step of applying the photo curing adhesive;
  a step of irradiating light onto and curing the adhesive that was applied to the surface of the first transparent member, wherein light is irradiated from both sides of the adhesive so that light passes through both the first transparent member and the second transparent member and reaches the adhesive; and a step of removing the cured adhesive from the surface of the first transparent member to obtain a double-sided adhesive material.

2. The manufacturing method for the double-sided adhesive material according to claim 1, wherein the photo curing adhesive is an ultraviolet light curing acrylic adhesive.

\* \* \* \* \*

UNITED STATES PATENT AND TRADEMARK OFFICE
CERTIFICATE OF CORRECTION

PATENT NO. : 9,649,790 B2  
APPLICATION NO. : 14/361886  
DATED : May 16, 2017  
INVENTOR(S) : Kotaro Shinozaki Page 1 of 1

It is certified that error appears in the above-identified patent and that said Letters Patent is hereby corrected as shown below:

In the Specification

Column 3:
Line 62, delete "acryloyol morpholin," and insert -- acryloyl morpholine, --, therefor.

Column 5:
Line 59, delete "Aerosyl," and insert -- Aerosil, --, therefor.

Signed and Sealed this  
Fifth Day of December, 2017

Joseph Matal  
*Performing the Functions and Duties of the*  
*Under Secretary of Commerce for Intellectual Property and*  
*Director of the United States Patent and Trademark Office*